(12) United States Patent
Kim

(10) Patent No.: US 9,267,489 B2
(45) Date of Patent: Feb. 23, 2016

(54) ENGINE FOR CONVERSION OF THERMAL ENERGY TO KINETIC ENERGY

(71) Applicant: Seong Woong Kim, Flushing, NY (US)

(72) Inventor: Seong Woong Kim, Flushing, NY (US)

(*) Notice: Subject to any disclaimer, the term of this patent is extended or adjusted under 35 U.S.C. 154(b) by 195 days.

(21) Appl. No.: 13/841,137

(22) Filed: Mar. 15, 2013

(65) Prior Publication Data

US 2013/0205768 A1    Aug. 15, 2013

Related U.S. Application Data

(63) Continuation-in-part of application No. 12/909,114, filed on Oct. 21, 2010, now Pat. No. 8,453,443, and a continuation-in-part of application No. 12/533,031, filed on Jul. 31, 2009, now abandoned.

(60) Provisional application No. 61/253,656, filed on Oct. 21, 2009, provisional application No. 61/085,978, filed on Aug. 4, 2008, provisional application No. 61/684,206, filed on Aug. 17, 2012.

(51) Int. Cl.
*F03B 17/02* (2006.01)
*F03B 17/00* (2006.01)

(52) U.S. Cl.
CPC ................ *F03B 17/00* (2013.01); *F03B 17/02* (2013.01); *Y02E 10/20* (2013.01)

(58) Field of Classification Search
CPC ........................ F03G 7/10; F03B 17/02–17/04
USPC .......... 60/675, 495, 496, 641.1, 641.2, 641.6, 60/641.8; 415/5, 7, 916; 290/1 R, 1 D, 1 E
See application file for complete search history.

(56) References Cited

U.S. PATENT DOCUMENTS 253,867 A * 2/1882 Iske ............................... 60/675
2,513,692 A   7/1950 Tubbs
(Continued)

FOREIGN PATENT DOCUMENTS

CN   1255958 A    6/2000
CN   101012814 A  8/2007
(Continued)

OTHER PUBLICATIONS

International Search Report and Written Opinion issued Aug. 15, 2013 in connection with Applicant's related International Patent Application No. PCT/US2013/055151.
(Continued)

*Primary Examiner* — Thomas Denion
*Assistant Examiner* — Laert Dounis
(74) *Attorney, Agent, or Firm* — Greenberg Traurig, LLP

(57) ABSTRACT

An engine for converting thermal energy to kinetic energy includes a first zone, a second zone, and a movable loop extending between the first zone and the second zone. Containers are attached to the loop such that the loop and the containers are movable conjointly between the first zone and the second zone. Each of the containers is adapted to receive a varying amount of a working fluid therein and is adapted to be in a plurality of states, including a first state, in which it contains a first amount of the working fluid, and a second state, in which it contains a second, larger amount of the working fluid. Each of the containers is caused to be in its first state as it moves through the first zone and in its second state as it moves through the second zone so as to impart motion to the loop.

20 Claims, 11 Drawing Sheets

(56) References Cited

U.S. PATENT DOCUMENTS

| | | | |
|---|---|---|---|
| 3,360,926 A | | 1/1968 | Parr |
| 3,410,086 A | | 11/1968 | Bobkin |
| 3,934,964 A | * | 1/1976 | Diamond ........................... 415/7 |
| 3,984,985 A | * | 10/1976 | Lapeyre ..................... 60/641.13 |
| 4,027,479 A | | 6/1977 | Cory |
| 4,074,534 A | * | 2/1978 | Morgan ........................... 60/675 |
| 4,233,813 A | * | 11/1980 | Simmons ........................ 60/496 |
| 4,325,216 A | | 4/1982 | Mermis |
| 4,838,025 A | | 6/1989 | Nelis |
| 5,125,233 A | | 6/1992 | Evanger et al. |
| 5,372,474 A | * | 12/1994 | Miller ................................ 415/1 |
| 5,430,333 A | * | 7/1995 | Binford et al. .................. 290/54 |
| 5,685,147 A | | 11/1997 | Brassea |
| 6,100,600 A | | 8/2000 | Pflanz |
| 6,978,610 B2 | | 12/2005 | Carnahan |
| 7,735,318 B1 | | 6/2010 | Curiel |
| 8,453,443 B2 | | 6/2013 | Kim |
| 2003/0033806 A1 | | 2/2003 | Bittner |
| 2004/0240996 A1 | | 12/2004 | Thien |
| 2009/0121488 A1 | * | 5/2009 | Bhatti et al. ..................... 290/54 |
| 2010/0024413 A1 | | 2/2010 | Kim |
| 2011/0083430 A1 | | 4/2011 | Kim |
| 2014/0298796 A1 | * | 10/2014 | Dunn .............................. 60/531 |

FOREIGN PATENT DOCUMENTS

| | | | | |
|---|---|---|---|---|
| CN | 101413490 A | | 4/2009 | |
| EP | 41681 A1 | * | 12/1981 | .............. F03B 17/04 |
| GB | 2128258 A | * | 4/1984 | ................ F03G 7/06 |
| JP | 2001-200778 A | | 7/2001 | |
| JP | 2007-100682 A | | 4/2007 | |
| JP | 2008-223742 A | | 9/2008 | |
| WO | WO 2009060244 A2 | * | 5/2009 | ................ F03G 7/10 |
| WO | WO 2010/017127 A2 | | 2/2010 | |
| WO | WO 2011/050156 A2 | | 4/2011 | |

OTHER PUBLICATIONS

International Search Report and Written Opinion issued Mar. 16, 2010 in connection with Applicant's related International Patent Application No. PCT/US2009/052553.

International Search Report and Written Opinion issued Jun. 3, 2011 in connection with Applicant's related International Patent Application No. PCT/US2010/053536.

Notification of First Office Action dated Nov. 2, 2015 issued in Chinese Patent Application No. 201380052969.7, including English-Language Translation thereof (19 pages).

* cited by examiner

_US 9,267,489 B2_

ENGINE FOR CONVERSION OF THERMAL ENERGY TO KINETIC ENERGY

CROSS-REFERENCE TO RELATED APPLICATION

The present application is a continuation-in-part of U.S. patent application Ser. No. 12/909,114 filed Oct. 21, 2010, which claims the benefit of U.S. Provisional Patent Application Ser. No. 61/253,656 filed Oct. 21, 2009 and which is a continuation-in-part of U.S. patent application Ser. No. 12/533,031 filed Jul. 31, 2009 (now abandoned), which claims the benefit of U.S. Provisional Patent Application Ser. No. 61/085,978 filed Aug. 4, 2008. The present application also claims the benefit of U.S. Provisional Application Ser. No. 61/684,206 filed Aug. 17, 2012. The disclosures of each of the aforementioned patent applications are incorporated herein by reference in their entirety.

FIELD OF THE INVENTION

The present invention relates to an engine for converting thermal energy to kinetic energy.

BACKGROUND OF THE INVENTION

The conversion of thermal energy to kinetic energy has long been utilized in the production of work. Many of the conversions use non-renewable thermal energy sources such as oil, coal, and/or natural gas which pollute the environment with undesirable by-products of combustion (e.g., carbon dioxide). It is therefore desirable to use renewal thermal energy sources such as geothermal to produce kinetic energy.

SUMMARY OF THE INVENTION

An engine for converting thermal energy to kinetic energy is provided. The engine includes a first zone and a second zone and a movable loop, which extends between the first zone and the second zone. Containers are attached to the loop such that the loop and the containers are movable conjointly between the first zone and the second zone. Each of the containers is adapted to receive a varying amount of a working fluid therein and is adapted to be in a plurality of states, including a first state, in which it contains a first amount of the working fluid, and a second sate, in which it contains a second amount of the working fluid, the first amount being smaller than the second amount. Each of the containers is caused to be in its first state as it moves through the first zone and in its second state as it moves through the second zone so as to impart motion to the loop.

BRIEF DESCRIPTION OF THE DRAWINGS

For a more complete understanding of the present invention, reference is made to the following detailed description of exemplary embodiments considered in conjunction with the accompanying drawings, in which.

DETAILED DESCRIPTION OF THE EXEMPLARY EMBODIMENTS

Figure 1:
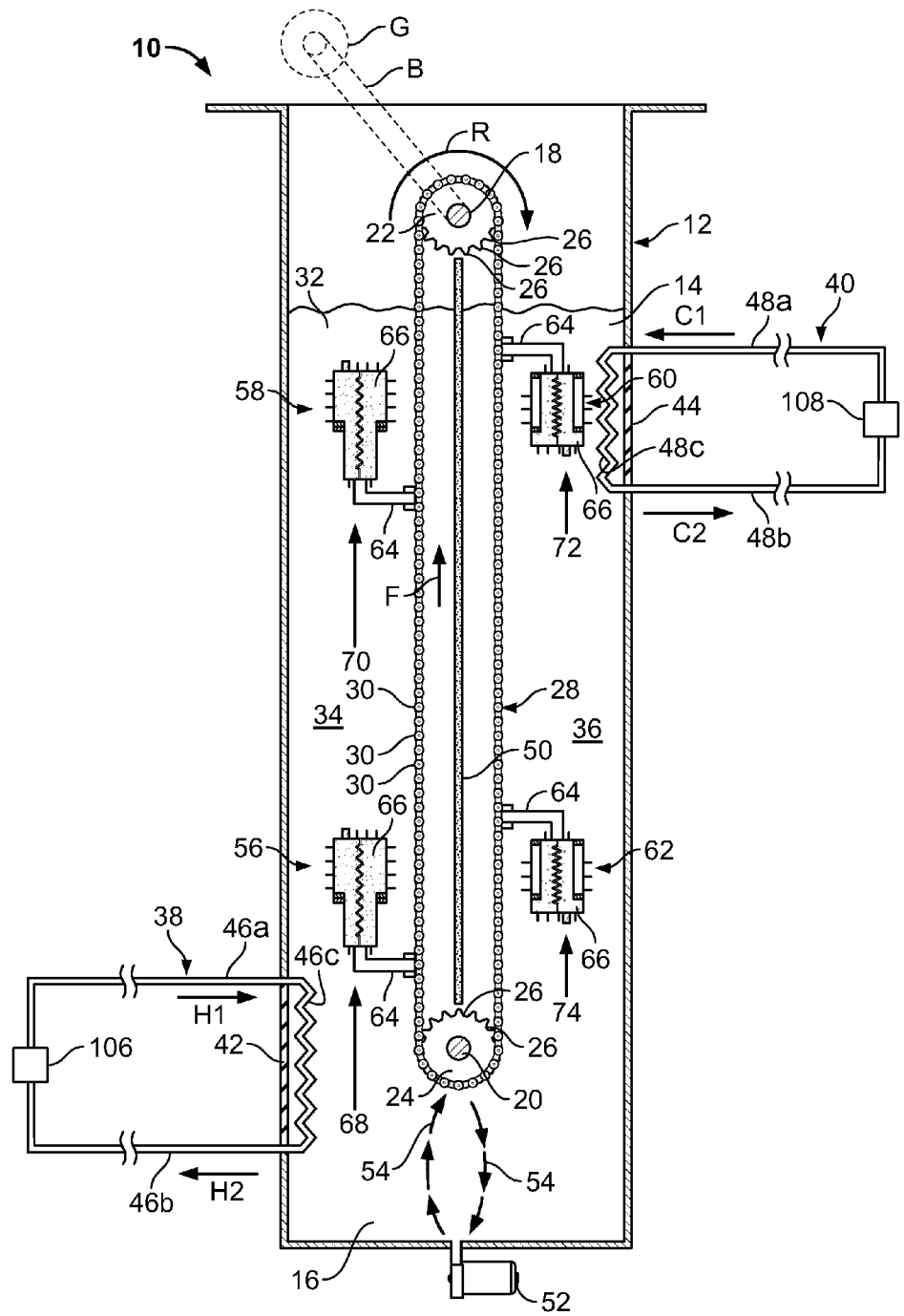
FIG. 1 is a cross-sectional schematic side view of an engine constructed in accordance with a first embodiment of the present invention, the engine having a plurality of fluid-tight containers depicted in sectional views for clarity.

FIG. 1 illustrates an engine 10 constructed in accordance with an exemplary embodiment of the present invention for converting thermal energy into kinetic energy. The engine 10 has a housing 12, which has an upper area 14 and a lower area 16. Upper and lower shafts 18, 20 are rotatably supported by the housing 12 in the upper and lower areas 14, 16, respectively, and include upper and lower sprockets 22, 24, respectively, which are fixedly mounted thereon and each of which is equipped with teeth 26. A loop of chain 28 (e.g., a loop of roller-chain, belt, cable, etc.) having a plurality of links 30 is provided so as to roll over the upper and lower sprockets 22, 24. More particularly, the links 30 of the chain 28 are adapted to mesh with the teeth 26 of the upper and lower sprockets 22, 24 so that longitudinal movement in the chain 28 produces rotational movement in the sprockets 22, 24 and hence the upper and lower shafts 18, 20, respectively.

Liquid 32 (e.g., water or any other suitable fluid) is contained in the housing 12 and has a hot liquid zone 34 and a cool liquid zone 36. A thermal energy source 38 and a thermal energy sink 40 are connected to the hot and cold liquid zones 34, 36, respectively, and are retained by liquid-tight seals 42, 44, respectively. The thermal energy source 38 includes pipes or tubes 46a, 46b and a heat exchanger 46c, which is connected to the pipes 46a, 46b, for providing thermal energy to the hot liquid zone 34. More particularly, hot liquid or gas (not shown), which is heated by a renewable energy source 106 (e.g., solar, geothermal, ocean-thermal, etc.), flows through the pipe 46a into the hot liquid zone 34 (as indicated by arrow H1 in FIG. 1). The hot liquid or gas then flows through the heat exchanger 46c, wherein thermal energy is transferred to the hot liquid zone 34, and out of the hot liquid zone 34 through the pipe 46b (as indicated by arrow H2 in FIG. 1). Similarly, the thermal energy sink 40 includes pipes or tubes 48a, 48b and a heat exchanger 48c, which is connected to the pipes 48a, 48b, for removing thermal energy from the cold liquid zone 36. More particularly, cold liquid or gas (not shown), which is cooled by a renewable energy sink 108 (e.g., geothermal, ocean-thermal, etc.), flows through the tubing 48a into the cold liquid zone 36 (as indicated by arrow C1 in FIG. 1). The cold liquid or gas then flows through the heat exchanger 48c, wherein thermal energy is removed from the cold liquid zone 36, and out of the cold liquid zone 36 through the pipe 48b (as indicated by arrow C2 in FIG. 1). The heat exchanger 46c and the heat exchanger 48c may be provided with conventional heat transfer mechanisms (e.g., fins) that facilitate the transfer of heat into and out of the hot and cold liquid zones 34, 36, respectively. Moreover, to promote heat exchange efficiently, the energy source 38 is positioned proximate the lower area 16 of the housing 12, while the energy sink 40 is positioned proximate the upper area 14 of the housing 12 (e.g., proximate the upper sprocket 22).

A baffle 50 is positioned in the housing 12 (e.g., within the confines of an inner loop formed by the chain 28) to abate the direct intermixing of thermal energy between the hot and cool liquid zones 34, 36. A water pump 52 is also provided to create a circulating water current 54 that may be located proximate the lower area 16 of the housing 12 (e.g., below the baffle 50 and outside the confines of the chain 28). The circulating water current 54 forms a water curtain so as to further inhibit the intermixing of thermal energy between the hot liquid zone 34 and the cold liquid zone 36 in the lower area 16.

Continuing to refer to FIG. 1, gas or fluid-tight containers 56, 58, 60, 62 are attached to the chain 28 by brackets 64 and are immersed in the liquid 32. The containers 56, 58, 60, 62 are adapted to move sequentially through the hot and cold zones 34, 36 so as to cause the chain 28 and the sprockets 22, 24 to rotate. In order to cause such rotation, each of the containers 56, 58, 60, 62 is provided with a working fluid 66 which may be air, carbon dioxide, refrigerant or any other fluid know in the art. The working fluid 66 is adapted to expand and contract in order to cause the volume of the containers 56, 58, 60, 62 to increase or decrease. The construction and operation of the containers 56, 58, 60, 62 will be discussed below in greater detail.

Figure 2:
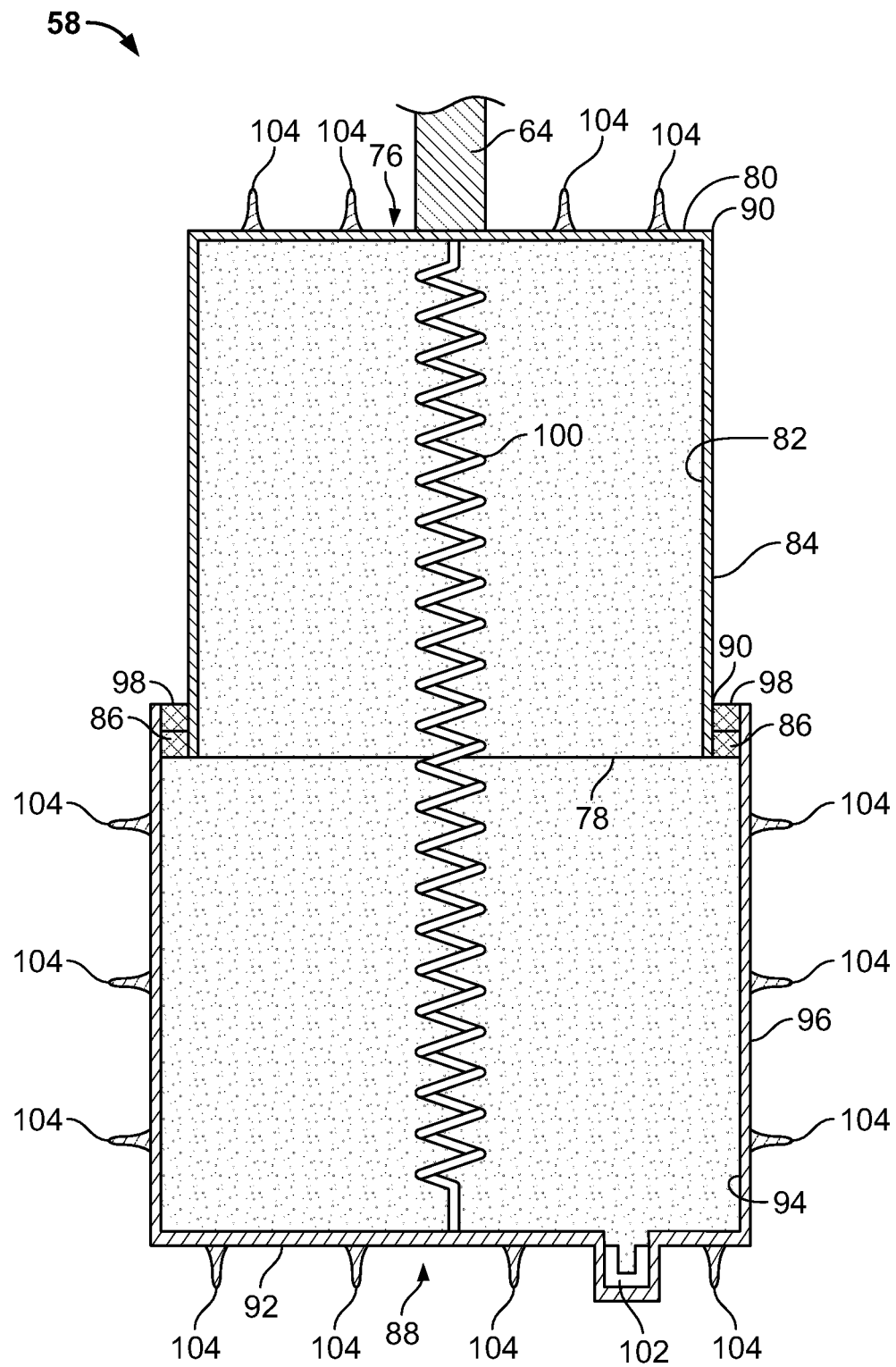
FIG. 2 is an enlarged cross-sectional view of one of the gas tight containers shown in FIG. 1, the container being shown in its expanded position.
Figure 3:
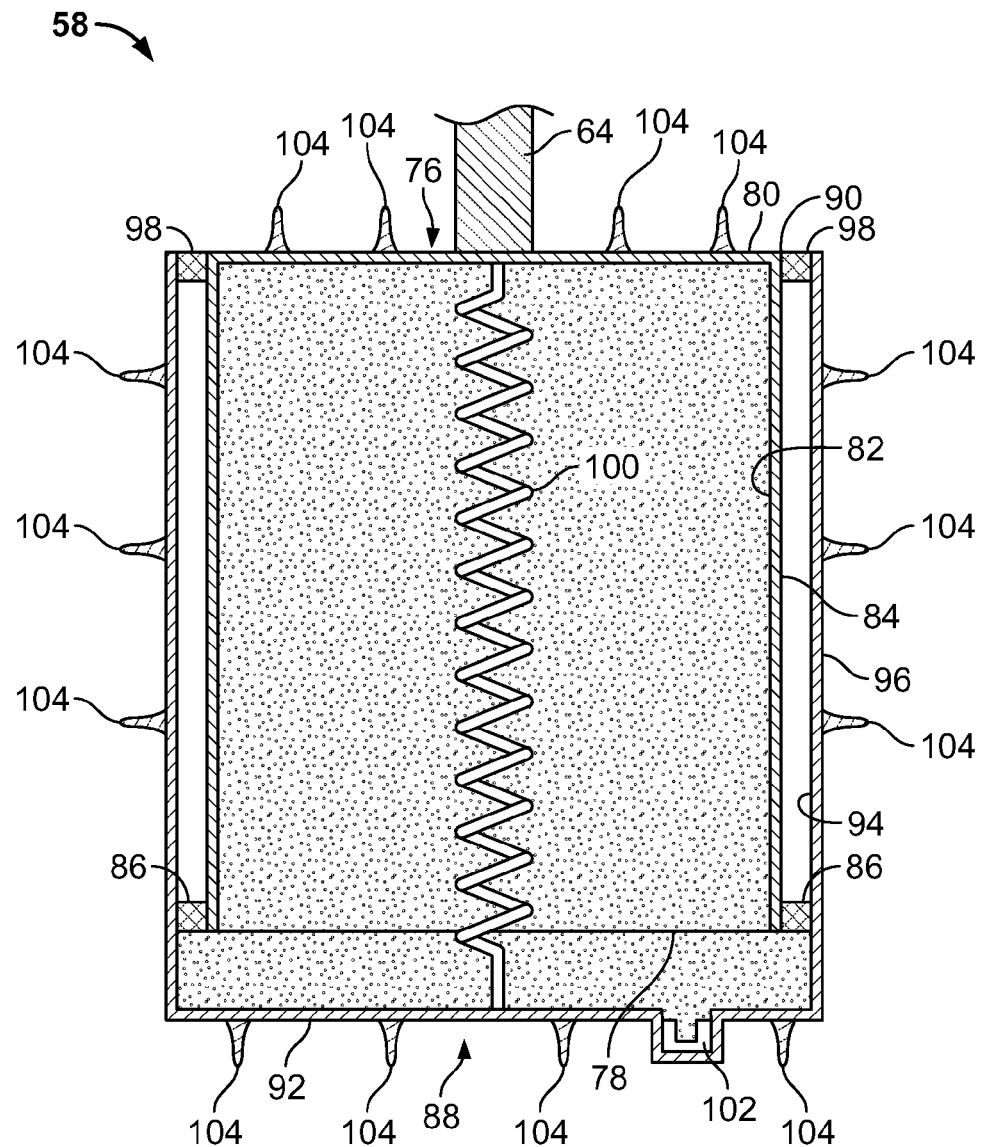
FIG. 3 is an enlarged cross-sectional view of one of the containers shown in FIG. 1, the container being shown in its contracted position.

Referring to FIGS. 2 and 3, the container 58 includes an inner cylinder 76, which has an open end 78 and a closed end 80, and inner and outer surfaces 82, 84. The container 58 also includes an outer cylinder 88 having an open end 90 and a closed end 92, as well as inner and outer surfaces 94, 96. The outer cylinder 88 is slidably attached to the inner cylinder 76 such that the outer cylinder 88 is moveable relative to the inner cylinder 76 between a collapsed position, in which the inner cylinder 76 is positioned within the outer cylinder 88 (see FIG. 3), and an expanded position, in which the inner cylinder 76 extends outwardly from the outer cylinder 88 (see FIG. 2). A sealing ring 86 is positioned between the outer surface 84 of the inner cylinder 76 and the inner surface 94 of the outer cylinder 88 proximate the open end 78 so as to make the container 58 fluid tight. At least one retaining ring 98 is attached to the outer cylinder 88 proximate the open end 90 so as to prevent the outer cylinder 88 from sliding off the inner cylinder 76. A coil spring 100 or other suitable elastomeric urging element is also attached to the closed end 80 of the inner cylinder 76 and the closed end 92 of the outer cylinder 88 so as to urge the outer cylinder 88 to move towards its collapsed position. A valve 102 is provided for filling the container 58 with the working fluid 66. Fins 104 are disposed on the outer surfaces 84, 96 of the inner and outer cylinders 76 and 88, respectively, so as to facilitate the transfer of heat into and out of the working fluid 66 contained therewithin. The inner and outer cylinders 76 and 88 may be fabricated from any suitable corrosion resistant, thermally conductive material (e.g., plastic or metal).

Each of the containers 56, 60, 62 has a construction and operation which are identical to those of the container 58 illustrated in FIGS. 2 and 3. In such circumstances, the specific construction of the containers 56, 60, 62 will not be discussed herein.

The operation of the engine 10 will now be discussed with reference to FIG. 1. In FIG. 1, the containers 56, 58 are located in the hot liquid zone 34, while the containers 60, 62 are located in the cold liquid zone 36. The working fluid 66 in each of the containers 56, 58 absorbs thermal energy from the hot liquid zone 34 and expands, causing the outer cylinders 88 to move from their contracted positions (see FIG. 3) to their expanded positions (see FIG. 2) and thereby causing the volume of the containers 56, 58 to increase (i.e., the containers 56, 48 expand to an expanded volume). Since the working fluid 66 in the containers 56, 58 has an increased volume but the same mass, it provides increased buoyant forces 68, 70 acting on the containers 56, 58, respectively. In contrast, the working fluid 66 in each of the containers 60, 62 releases its thermal energy to the cold liquid zone 36 and contract, causing the outer cylinders 88 to move from their expanded positions (see, e.g., FIG. 2) to their contracted positions (see, e.g., FIG. 3) and thereby causing the volume of the containers 60, 62 to decrease (i.e., the containers 60, 62 contract to a decreased volume). Since the working fluid 66 in the containers 60, 62 has a decreased volume but the same mass, it provides decreased buoyant forces 72, 74 acting on the containers 60, 62, respectively. As a result, the sum of the buoyant forces 68, 70 acting on the containers 56, 58 is greater than the sum of the buoyant forces 72, 74 acting in the containers 60, 62, thereby resulting in a resultant force F which causes the chain 28 to rotate in a clockwise direction (as indicated by arrow R in FIG. 1). As a result of the continuous flow of thermal energy into and out of the hot and cold liquid zones 34, 36, respectively, the containers 56, 58, 60, 62 continuously move between the hot and cold liquid zones 34, 36, thereby imparting continuous motion to the chain 28. The movement of the chain 28 imparts rotational kinetic energy to the upper and lower sprockets 22, 24 and hence the shafts 18, 20. A suitable mechanism may be employed to store and/or utilize the rotational kinetic energy of the shafts 18, 20. For example, an electric generator G (shown in phantom in FIG. 1) may be driven by the shaft 18 via a belt B to convert the kinetic energy to electric energy.

The present invention provides a number of benefits and advantages. For instance, the conversion of renewable thermal energy to kinetic energy is performed in an environmentally friendly and cost effective manner. The production of kinetic energy is provided in a mechanically simple manner (i.e., the force F produces motion in the chain 28 which imparts rotational kinetic energy to the sprockets 22, 24 and hence the shafts 18, 20).

It should be noted that the present invention can have numerous modifications and variations. For instance, the containers 56, 58, 60, and 62 may be fabricated from expandable and contractible components that are formed in different sizes and shapes, such as a balloon-shaped bladder fabricated from a single piece of elastomeric material. Individual engines may be fabricated with a combination of differently sized and shaped containers. The retaining ring 98 may also be sized and shaped to function as a back-up sealing ring (i.e., it may function as a secondary seal to contain the working fluid 66 in the containers 56, 58, 60, 62, should the sealing ring 86 leak). The surface of the liquid 32 may be set at an elevation (not shown) in the housing 12 such that the upper sprocket 22 is submerged in the liquid 32 and the containers 56, 58, 60, 62 are submerged in the liquid through their movement between the hot and cold liquid zones 34, 36.

FIG. 4, FIG. 5, FIGS. 6-8A, FIGS. 9A-9B, FIG. 10 and FIG. 11 illustrate second through eight, respectively, embodiments of the present invention. The elements illustrated in FIG. 4, FIG. 5, FIGS. 6-8A, FIGS. 9A-9B, FIG. 10 and FIG. 11, which correspond, either identically or substantially, to the elements described above with reference to the embodiment shown in FIGS. 1-3, have been designated by corresponding reference numerals increased by one thousand through seven thousand, respectively. New elements are designated by odd reference numerals in the one thousands through seven thousands, respectively. It should be noted that the use of corresponding reference numbers or odd numbers in conjunction with these embodiments is intended for illustration purposes only and is not meant to limit the scope of the invention.

Figure 4:
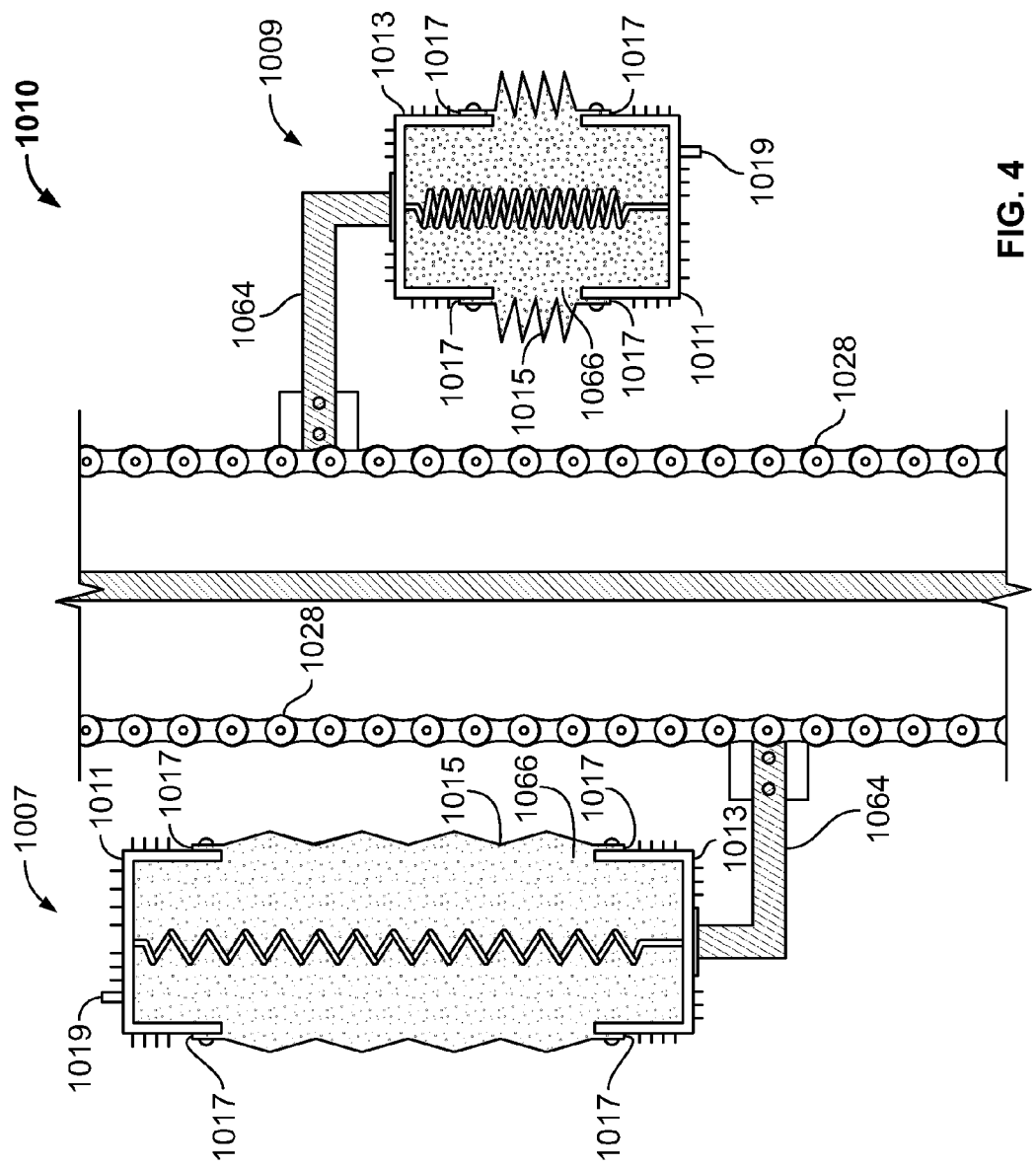
FIG. 4 is a partial cross-sectional schematic side view of an engine constructed in accordance with a second embodiment of the present invention.

Referring to FIG. 4, an engine 1010 is illustrated having gas or liquid-tight containers 1007 and 1009 that are attached to a chain 1028 by brackets 1064. It is noted that FIG. 4 illustrates only a portion of the engine 1010, which may be provided with additional containers (not shown) that are identical, in construction and operation, to the containers 1007 and 1009. It is noted that the engine 1010 is identical to the engine 10 in all respects, except that the containers 56, 58, 60, 62 are provided with a different construction. The construction of the containers 1007, 1009 is discussed below.

Each of the containers 1007 and 1009 has a pair of rigid caps 1011, 1013 that are attached to a bellows 1015 by seals 1017. The bellows 1015 are fabricated out of flexible material such as rubber. The bellows 1015 facilitate the movement of the containers 1007, 1009 from a contracted position (see the container 1009 in FIG. 4) to an expanded position (see the container 1007 in FIG. 4) and visa versa. Each of the containers 1007, 1009 also has a valve 1019 through which gas or liquid is initially supplied to the containers 1007, 1009.

Figure 5:
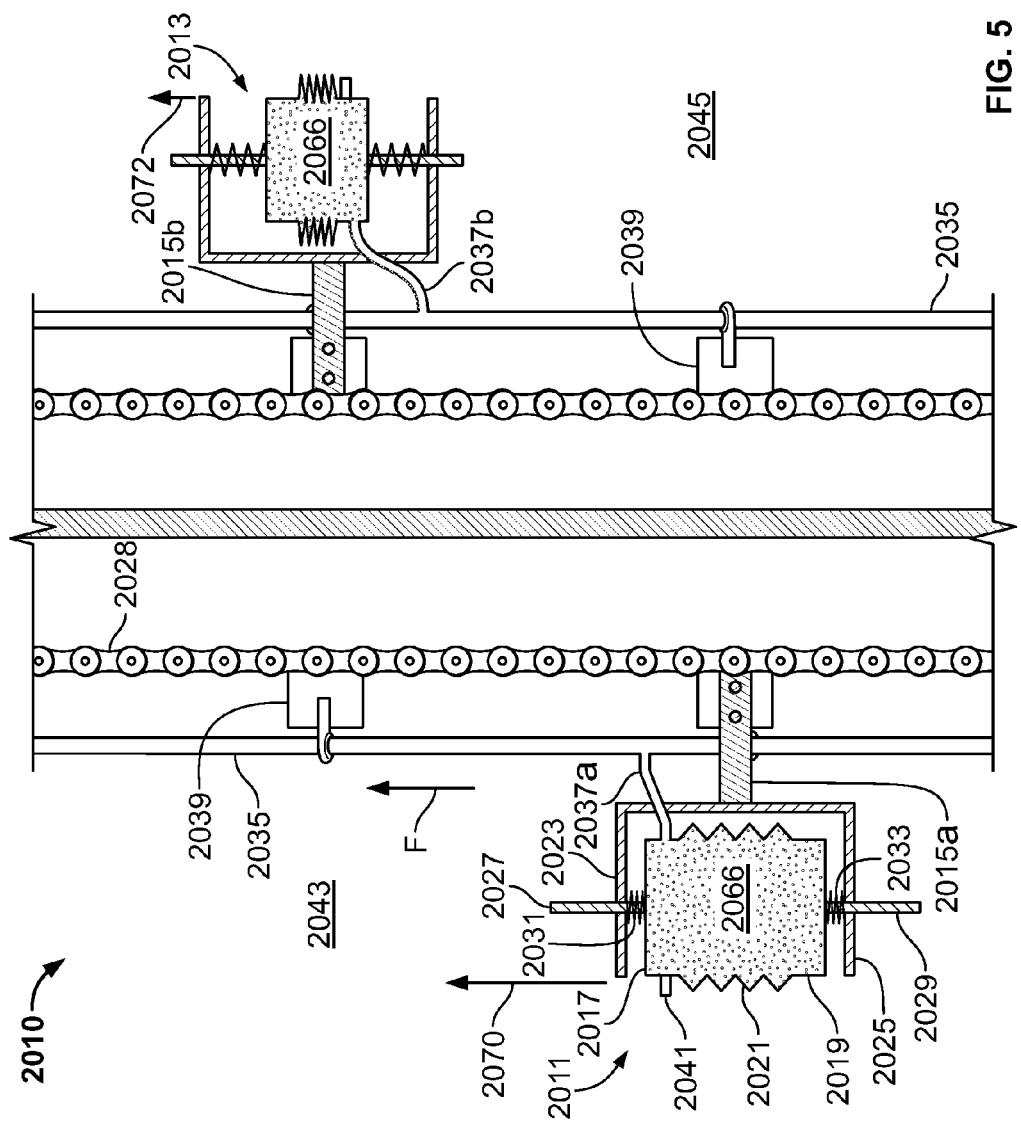
FIG. 5 is a partial cross-sectional schematic side view of an engine constructed in accordance with a third embodiment of the present invention.

Now referring to FIG. 5, an engine 2010 is equipped with a plurality of gas or liquid-filled containers 2011, 2013, which are attached to a chain 2028 via brackets 2015*a*, 2015*b*, respectively. It is noted that FIG. 5 illustrates only a portion of the engine 2010, which may be provided with additional containers (not shown) that are identical, in construction and operation, to the containers 2011, 2013. It is also noted that the engine 2010 has a construction and operation that are basically identical to those of the engine 10 shown in FIG. 1 and/or the engine 1010 shown in FIG. 4, except as is discussed below.

With reference to FIG. 5, the container 2011 has end portions or caps 2017, 2019 and a bellows portion 2021, which adjoins the end portions 2017, 2019 to each other in a fluid-tight manner. The end portions 2017, 2019 and the bellows portion 2021 are constructed and assembled in a manner similar to the manner in which the rigid caps 1011, 1013 and bellows 1015 shown in FIG. 4 are constructed. The bellows portion 2021 facilitates the movement of the container 2011 from an expanded position (see the container 2011 in FIG. 5) to a compressed position (see, for instance, the container 2013 in FIG. 5) and visa versa. The end portion 2017 is equipped with a valve 2041 through which a gas or liquid is initially supplied to the container 2011.

The bracket 2015*a* has a pair of braces 2023, 2025, between which the container 2011 is interposed. Support bars 2027, 2029, which are affixed to the end portions 2017, 2019, respectively, of the container 2011, are slidably supported by the braces 2023, 2025, respectively, such that they are longitudinally movable relative to the braces 2023, 2025, respectively. More particularly, the support bars 2027, 2029 movably support the container 2011 on the bracket 2015*a* such that the container 2011 can expand and contract during the operation of the engine 2010.

Temperature sensitive springs 2031, 2033 are disposed on the support bars 2027, 2029, respectively. More particularly, the spring 2031 is positioned between, and attached to, the brace 2023 and the end portion 2017 of the container 2011, while the spring 2033 is positioned between, and attached to, the brace 2025 and the end portion 2019 of the container 2011. Each of the springs 2031, 2033, which can be made from a conventional shape memory alloy, utilizes heating and cooling to move between a high-temperature shape and a low temperature shape. More particularly, each of the springs 2031, 2033 expands and contracts based on the temperature of the surrounding liquid or fluid to which they are exposed so as to cause the container 2011 to move between its expanded and compressed positions.

The container 2013 has a construction and operation that are basically identical to those of the container 2011. In such circumstances, the specific construction of the container 2013 will not be discussed herein.

A fluid hose 2035 is connected to the containers 2011, 2013 via exhaust hoses 2037*a*, 2037*b*, respectively. The fluid hose 2035 is affixed to the chain 2028 via a plurality of hose brackets 2039 so that the fluid hose 2035 is movable conjointly with the chain 2028 and, hence, the containers 2011, 2013. The fluid hose 2035, which form a loop around the chain 2028, functions as a conduit through which gas or liquid may flow from the container 2011 to the container 2013 and vice versa, thus facilitating the expansion and contraction of the containers 2011, 2013 in a manner further discussed below. The fluid hose 2035, the exhaust hoses 2037*a*, 2037*b*, and the containers 2011, 2013 form a closed (i.e., fluid-tight) system such that the amount of fluid contained in the system remains substantially constant (i.e., the fluid does not escape from the system).

In operation, the engine 2010 is immersed in a liquid having a cold liquid zone 2043, which is connected to a thermal energy sink (not shown), and a hot liquid zone 2045, which is connected to a thermal energy source (not shown). The containers 2011, 2013 and the fluid hose 2035 are filled with a working fluid 2066 (e.g., a gas) via the valve 2041. The working fluid 2066 has a lower density than that of the liquid surrounding the containers 2011, 2013.

When the container 2011 is in the cold liquid zone 2043, the springs 2031, 2033 contract to their respective low-temperature shapes. Because the low-temperature shape of each of the springs 2031, 2033 has a length smaller than that of its high-temperature shape, the springs 2031, 2033 pull the end portions 2017, 2019, respectively, of the container 2011 away from one another (i.e., toward the braces 2023, 2025, respectively), thereby causing the container 2011 to expand to its expanded position (see the container 2011 in FIG. 5). As discussed above, the container 2011 is in fluid communication with the fluid hose 2035, which in turn is in fluid communication with the container 2013. In such circumstances, as the container 2011 expands, working fluid 2066 flows into the container 2011 from the fluid hose 2035, the container 2013 and/or other containers of the engine 2010, thereby increasing the volume or amount of the working fluid 2066 present in the container 2011. Due to its increased volume/amount, the working fluid 2066 in the container 2011 provides an increased buoyant force 2070 acting on the container 2011.

In contrast, when the container 2013 is in the hot liquid zone 2045, its temperature sensitive springs expand to their respective high-temperature shapes (see FIG. 5), which have a length greater than their low-temperature shapes. As a result, the springs push end portions (i.e., end caps) of the container 2013 towards one another, thereby causing the container 2013 to contract to its compressed position (see the container 2013 in FIG. 5). Because the container 2013 is in fluid communication with the fluid hose 2035, at least some working fluid 2066 flow out from the container 2013 into the fluid hose 2035, the container 2011 and/or other containers of the engine 2010, thereby decreasing the volume or amount of the working fluid 2066 in the container 2013. Due to its decreased volume/amount, the working fluid 2066 remaining in the container 2013 provides a decreased buoyant force 2072 acting on the container 2013. The decreased buoyant force 2072 acting on the container 2013 is smaller than the buoyant force 2070 acting on the container 2011. As a result, a resultant force F acts on the chain 2028 to move same in a clockwise direction. Due to the continuous flow of thermal energy into and out of the hot and cold liquid zones 2045, 2043, respectively, the containers 2011, 2013 continuously move between the cold and hot liquid zones 2043, 2045, thereby imparting continuous motion to the chain 2028.

Figure 6:
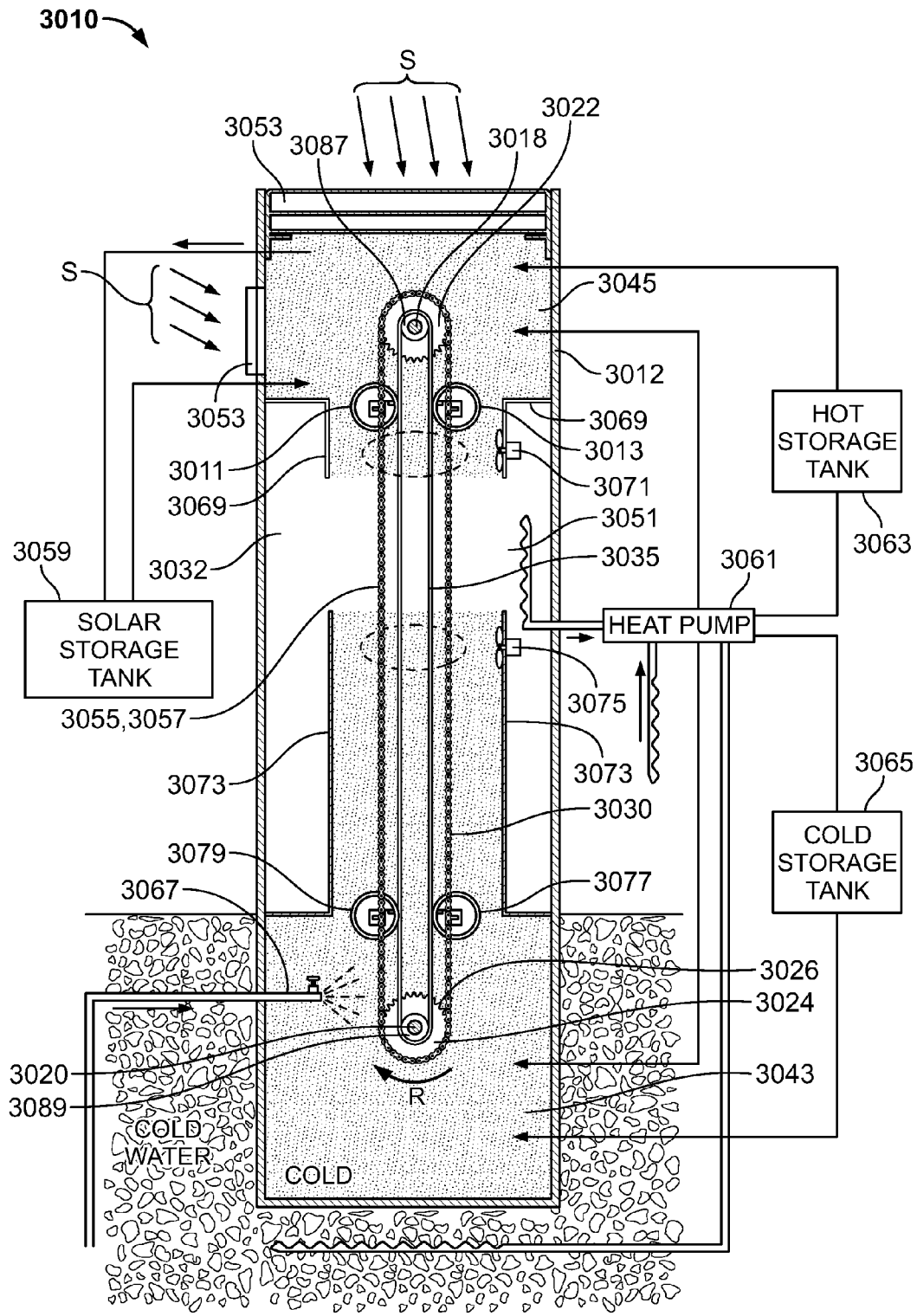
FIG. 6 is a cross-sectional schematic side view of an engine constructed in accordance with a fourth embodiment of the present invention.
Figure 7:
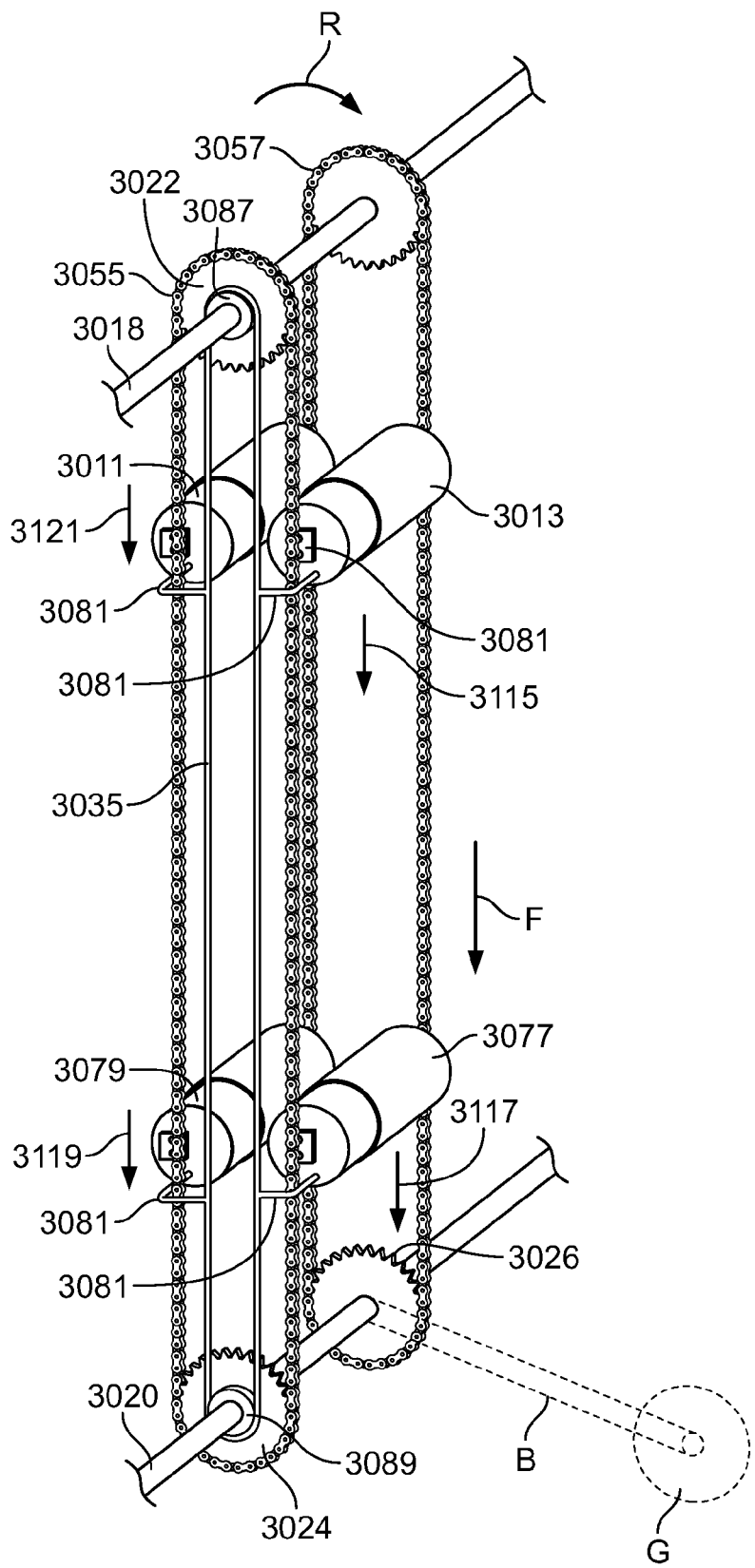
FIG. 7 is a partial perspective view of a moving container mechanism of the engine shown in FIG. 6.
Figure 8:
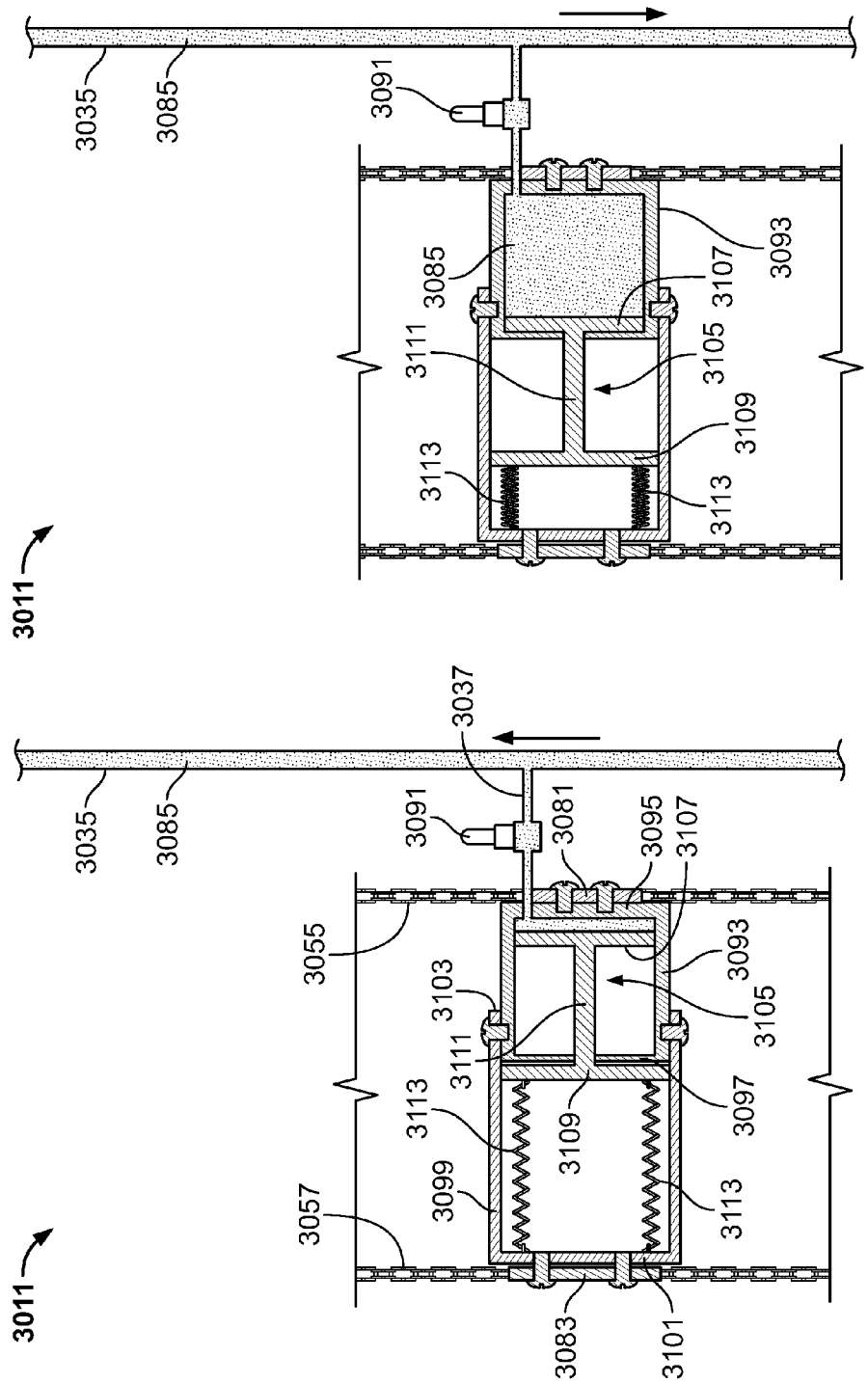
FIGS. 8A and 8B are enlarged cross-sectional views of one of the containers shown in FIGS. 6 and 7, the container being shown in its contracted and expanded positions, respectively.
Figure 9:
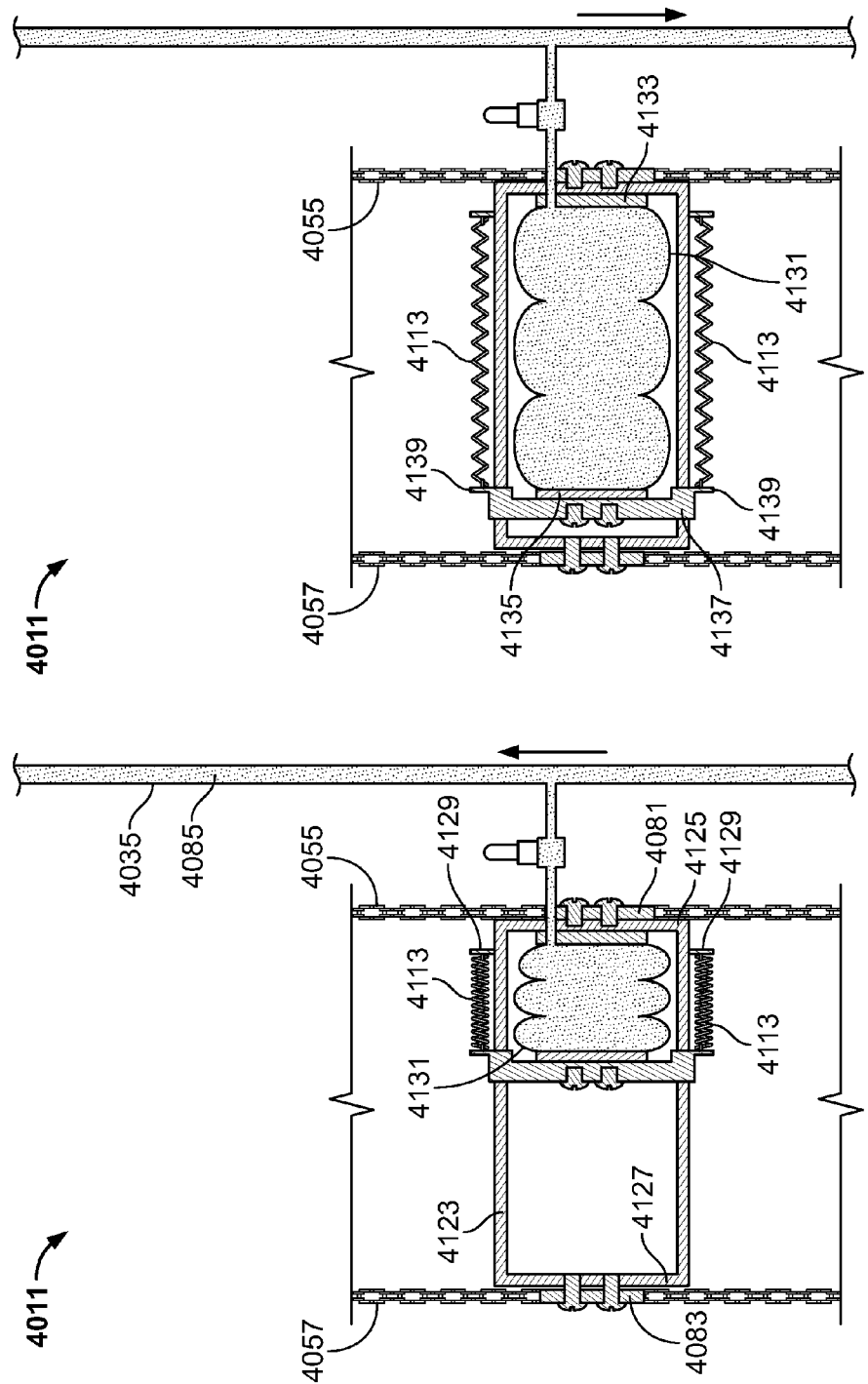
FIGS. 9A and 9B are enlarged cross-sectional views of one of the containers of an engine constructed in accordance with a fifth embodiment of the present invention.

FIGS. 6 and 7 illustrate an engine 3010 constructed in accordance with a fourth exemplary embodiment of the present invention for converting thermal energy to kinetic energy. The engine 3010 has a construction and operation that are similar to those of the embodiments discussed above (especially the embodiment shown in FIG. 5), unless otherwise indicated. The engine 3010 includes a housing 3012, which contains a body of air 3032 (or other suitable fluid or gas) therein, includes a top hot zone 3045, a middle zone 3051 and a bottom cool zone 3043. Insulation glass panels 3053 are installed at the top and upper sides of the housing 3012 for purposes to be discussed hereinbelow. Upper and lower shafts 3018, 3020 are rotatably supported by the housing 3012 in the top hot zone 3045 and the bottom cool zone 3043, respectively, and include upper sprockets 3022 and lower sprockets 3024, respectively, which are fixedly mounted thereon and each of which is equipped with teeth 3026. Loops of chain 3055, 3057 (e.g., loops of roller-chain, belt, cable, etc.) having a plurality of links 3030 are provided so as to roll over a corresponding pair of the upper and lower sprockets 3022, 3024. More particularly, the links 3030 of each of the chains 3055, 3057 are adapted to mesh with the teeth 3026 of a corresponding pair of the upper and lower sprockets 3022, 3024 so that longitudinal movement of the chains 3055, 3057 produces rotational movement of the sprockets 3022, 3024 and hence the upper and lower shafts 3018, 3020.

Renewable energy sources are used to provide hot thermal energy to the top hot zone 3045 of the engine 3010. For instance, solar energy (indicated by arrows S in FIG. 6) transfers through the illustration glass panels 3053 (which are translucent or transparent) to heat the air 3032 contained in the housing 3012. In this regard, the glass panels 3053 are adapted to retain the heat in the top hot zone 3045. In one embodiment, the glass panels 3053 can be replaced with other suitable panels (such metal panels, etc.) or mechanisms that are able to provide solar energy or other thermal renewable energy to the top hot zone 3045.

As shown in FIG. 6, a solar storage tank 3059 is provided to store excess thermal energy so that such energy may be supplied to the top hot zone 3045 as needed. A heat pump 3061 is also provided to withdraw unneeded thermal energy from the middle zone 3051. The heat pump 3061 may also be configured to gather external thermal energy of any kind (e.g., solar, geothermal, ocean-thermal, etc.). Any excess hot or cold thermal energy drawn by the heat pump 3061 may be stored in hot or cold storage tanks 3063, 3065, respectively, and can be selectively supplied to the top hot zone 3045 or the bottom cool zone 3043, respectively, as needed.

The bottom cool zone 3043 may be disposed underground to provide insulation and protection from the input of the solar energy S to the bottom cool zone 3043. A cold thermal energy source 3067 is also provided proximate the bottom of the housing 3012 to supply cold thermal energy to the bottom cool zone 3043. The cold thermal energy source 3067 may utilize cold water, geothermal energy, or any other suitable thermal energy input. Due to convection and the hot and cold thermal energy inputs, a temperature gradient is formed in the housing 3012 where the top hot zone 3045 has a temperature that is higher than that of the bottom cool zone 3043.

Upper L-shaped partitions 3069 are provided between the top hot zone 3045 and the middle zone 3051 to inhibit the intermixing of hot and cool fluid between the top hot zone 3045 and the bottom cool zone 3043. One of the upper L-shaped partition 3069 is attached to one side of the housing 3012, while the other upper L-shaped partition 3069 is attached to an opposite side of the housing 3012. An upper curtain fan 3071 is mounted to one of the upper L-shaped partitions 3069 to create an air curtain for the purpose of further inhibiting the transfer of thermal energy between the top hot zone 3045 and the middle zone 3051.

Similarly, lower L-shaped partitions 3073 are provided between the bottom cool zone 3043 and the middle zone 3051 to inhibit the intermixing of hot and cool fluid between the top hot zone 3045 and the bottom cool zone 3043. One of the lower L-shaped partitions 3073 is attached to one side of the housing 3012, while the other lower L-shaped partition 3073 is attached to an opposite side of the housing 3012. A lower curtain fan 3075 is positioned on one of the lower L-shaped partitions 3073 to create an air curtain for the purpose of further inhibiting the transfer of thermal energy between the bottom cool zone 3043 and the middle zone 3051.

Still referring to FIGS. 6 and 7, containers 3011, 3013, 3077, 3079 are attached to the chains 3055, 3057 by brackets 3081, 3083 (see also FIG. 8A). The containers 3011, 3013, 3077, 3079 are adapted to move sequentially through the hot, middle, and cold zones 3045, 3051, 3043 so as to cause the chains 3055, 3057 and the sprockets 3022, 3024 to rotate. In order to cause such rotation, each of the containers 3011, 3013, 3077, 3079 is adapted to be filled with a substantially incompressible working fluid 3085 (i.e., a fluid with a volume that is not significantly affected by changes in pressure, such as water or other suitable liquids). The working fluid 3085 may contain antifreeze, salt, or any other substance known in the art to inhibit the freezing of the fluid 3085. A fluid hose 3035 is connected to each of the containers 3011, 3013, 3077, 3079 by a communication hose 3037 and functions as a conduit through which the working fluid 3085 may flow between the containers 3011, 3013, 3077, 3079, thus allowing the expansion and contraction of the containers 3011, 3013, 3077, 3079 in a manner further discussed below. The fluid hose 3035 is restrained from lateral movement by wheels 3087, 3089 or other guiding protrusions mounted on the shafts 3018, 3020, respectively, and moves conjointly with the containers 3011, 3013, 3077, 3079 and the chains 3055, 3057. A valve 3091 (shown only in FIGS. 8A and 8B) is provided on each of the communication hoses 3037 so as to control the flow of the working fluid 3085 between the fluid hose 3035 and each of the containers 3011, 3013, 3077, 3079. The valves 3091 can be opened or closed through touch, weight, actuator, magnetic field, or any other suitable method known in the art as the containers 3011, 3013, 3077, 3079 move through the top hot zone 3045 and the bottom cool zone 3043. The fluid hose 3035 and the containers 3011, 3013, 3077, 3079 form a closed (i.e., fluid-tight) system, which allows the working fluid 3085 to travel between the fluid hose 3035 and the containers 3011, 3013, 3077, 3079 without the working fluid 3085 escaping the system.

Referring now to FIGS. 8A and 8B, the container 3011 includes a cylinder 3093 having opposed end plates 3095, 3097. The end plate 3095 is attached to the chain 3055 via the bracket 3081, and is connected to the fluid hose 3035 in a fluid-tight manner such that the flow of the working fluid 3085 into and out of the cylinder 3093 is controlled without the working fluid 3085 escaping the closed fluid system. A spring hold frame 3099 with a closed end 3101 and an open end 3103 is connected at the closed end 3101 to the chain 3057 via the bracket 3083, and at the open end 3103 to the cylinder 3093. Movably mounted inside the cylinder 3093 is a cylinder piston 3105, which includes opposed piston members 3107, 3109 that are connected by a stem member 3111 for purposes to be discussed below.

The container 3011 also includes shape memory springs 3113 or other suitable elastomeric, temperature-sensitive urging elements (see FIGS. 8A and 8B), which utilize heating and cooling to move between a high-temperature shape and a low-temperature shape. More particularly, each of the shape memory springs 3113 is adapted to assume an expanded configuration (see FIG. 8A) when it is in a cool or cold temperature condition and a contracted configuration (see FIG. 8B) when it is in warm or hot temperature conditions. Each of the shape memory springs 3113 is fixedly attached to the closed end 3101 of the spring hold frame 3099 and to the piston member 3109 such that the piston 3105 is movable between an "up" position and a "down" position in response to the change of the configurations of the shape memory springs 3113. That is, when the shape memory springs 3113 are in their expanded configurations, the piston 3105 moves to an "up" position (see FIG. 8A) to cause the working fluid 3085 to flow out of the cylinder 3093 into the fluid hose 3035 and one or more of the other containers 3013, 3077, 3079. Because the container 3011 has a reduced amount of the working fluid 3085, its overall weight is reduced (i.e., light) when the piston 3105 is in its "up" position. In contrast, when the shape memory springs 3113 are in their contracted configurations, the piston 3105 moves to a "down" position (see FIG. 8B) to cause the working fluid 3085 to flow into the cylinder 3093 from the fluid hose 3035 and one or more of the other containers 3013, 3077, 3079. Because the container 3011 has an increased amount of the working fluid 3085, its overall weight is increased (i.e., heavy) when the piston 3105 is in its "down" position.

In order to increase the sensitivity of the shape memory springs 3113 to the temperature of the air surrounding the container 3011, the cylinder 3093 and spring hold frame 3099 may be constructed of any suitable thermally conductive material (e.g., plastic or metal). Moreover, the spring hold frame 3099 may be equipped with openings or other mechanisms to readily transmit the temperature of the surrounding air to the shape memory springs 3113.

In operation, as the container 3011 moves into the top hot zone 3045, its associated valve 3091 is opened so as to allow the working fluid 3085 to flow into and out of the piston cylinder 3093. As the shape memory springs 3113 begin to absorb thermal energy from the top hot zone 3045, they begin to move to their contracted configuration (see FIG. 8B), causing the cylinder piston 3111 to move from the "up" position (see FIG. 8A) to the "down" position (see FIG. 8B). Since the fluid hose 3035 and the containers 3011, 3013, 3077, 3079 form a closed fluid system, this movement of the cylinder piston 3105 creates a suction force to cause the working fluid 3085 to be withdrawn into the container 3011. Due to the inflow of the working fluid 3085, the container 3011 has a much heavier weight compared to the weight it had when it entered the top hot zone 3045. Once the container 3011 reaches the expanded state depicted in FIG. 8B and/or as it moves out of the top hot zone 3045, the valve 3091 is actuated so as to be closed such that the working fluid 3085 is inhibited from flowing out of the container 3011.

Upon entry into the bottom cool zone 3043, the valve 3091 of the container 3011 is actuated to be opened, allowing the working fluid 3085 to flow into or out of the container 3011. As the shape memory springs 3113 begin to lose thermal energy to the surrounding cool zone 3043, they assume their expanded configurations, causing the piston 3105 to move from its "down" position (see FIG. 8B) to its "up" position (see FIG. 8A). As a result, the working fluid 3085 present in the cylinder 3093 is discharged therefrom into the fluid hose 3035 and one or more of the containers 3013, 3077, 3079. Suction force created by one or more of the containers 3013, 3077, 3079 similar to the suction force discussed above in conjunction with the container 3011 in the preceding paragraph may also cause the working fluid 3085 in the piston 3093 to be discharged from the container 3011. Given the reduced amount of the working fluid 3085 in the container 3011, the container 3011 has a much lighter weight compared to the weight it had as it left the top hot zone 3035. Once the container 3011 reaches the contracted state depicted in FIG. 8A and/or as it moves out of the bottom cool zone 3043, the valve 3091 is actuated so as to be closed such that the working fluid 3085 is inhibited from flowing out of the container 3011.

Each of the other containers 3013, 3077, 3079 has a construction and operation which are identical to those of the container 3011 illustrated in FIGS. 8A and 8B. In such circumstances, the specific construction of the containers 3013, 3077, 3079 will not be discussed herein. The engine 3010 may also be equipped with additional containers.

Referring back to FIGS. 6 and 7, the containers 3011, 3079 have passed through the middle zone 3051 and the bottom cold zone 3042, respectively, and are therefore in a state similar to the container state shown in FIG. 8A. In contrast, the containers 3013, 3077 have passed through the top hot zone 3045 and the middle zone 3051, respectively, and are therefore in a state that is similar to the container state illustrated in FIG. 8B. As a result, the weight of each of the containers positioned on the left side of the chains 3055, 3057 in FIG. 6 (i.e., the containers 3011, 3079) is less than that of each of the containers positioned on the right side of the chains 3055, 3057 in FIG. 6 (i.e., the containers 3013, 3077). As a result, the sum of gravitational forces lo 3115, 3117 acting on the containers 3013, 3077, respectively, is greater than the sum of gravitational forces 3119, 3201 acting on the containers 3011, 3079, respectively, thereby creating a resultant force F which causes the chains 3055, 3057 to rotate in a clockwise direction (as indicated by arrow R in FIGS. 6 and 7). As a result of the continuous flow of thermal energy into and out of the top hot and bottom cool zones 3045, 3043, respectively, the containers 3011, 3013, 3077, 3079 continuously move between the top hot zone 3045 and the bottom cool zone 3043, thereby imparting continuous motion to the chains 3055, 3057. The movement of the chains 3055, 3057 imparts rotational kinetic energy to the sprockets 3022, 3024 and hence the shafts 3018, 3020. A suitable mechanism may be employed to store and/or utilize the rotational kinetic energy of the shafts 3018, 3020. For example, an electric generator G (shown in phantom in FIG. 7) may be driven by the shaft 3020 via a belt B to convert the kinetic energy to electric energy.

In one embodiment, the valves 3091 of the containers 3011, 3013, 3077, 3079 may be eliminated. In another embodiment, the valves 3091 of at least two of the containers 3011, 3013, 3077, 3079 are in their open state simultaneously. In yet another embodiment, one or both of the shafts 3018, 3020 may be connected to a drive mechanism (e.g., a manual crank, an electric motor, etc.) such that it can be driven to impart initial motion to the containers 3011, 3013, 3077 and 3079 when they are stationary.

In another embodiment of the invention, the engine 3010 may be equipped with containers similar to a container 4011 (see FIGS. 9A and 9B). The container 4011 has a construction and operation similar to those of the container 3011 shown in FIGS. 8A and 8B, unless otherwise indicated below. The container 4011 includes a cylinder frame 4123 connected at its opposing ends 4125, 4127 to chains 4055, 4057 by brackets 4081, 4083. The cylinder frame 4123 includes cylinder frame hooks 4129 fixedly mounted to sides thereof adjacent the end 4125. The container 4011 also contains a bellows-type fluid cylinder 4131 connected to a fluid hose 4035. The fluid cylinder 4131 may be fabricated out of a flexible material (e.g., rubber), such that the container 4011 can move from a contracted configuration (see FIG. 9A) to an expanded configuration (see FIG. 9B) and vice versa. Side plates 4133, 4135 are attached to the fluid cylinder 4131 at opposing ends thereof. The side plate 4133 is fixedly attached to the end 4125, while the side plate 4135 is fixedly attached to a slide bracket 4137 which is movably mounted to the cylinder frame 4123 so as to allow the contraction and expansion of the fluid cylinder 4131. Slide bracket hooks 4139 are fixedly mounted to the slide bracket 4137, while shape memory springs 4113 are attached to the slide bracket hooks 4139 and the cylinder frame hooks 4129. Unlike the shape memory springs 3113 shown in FIGS. 8A and 8B, the shape memory springs 4113 are adapted to expand when thermal energy is absorbed thereby (e.g., when they are positioned in a hot zone), and to contract when thermal energy is removed therefrom (e.g., when they are positioned in a cool zone). FIG. 9A depicts the fluid cylinder 4131 in its "up" position corresponding to being compressed and low weight, while FIG. 9B depicts the fluid cylinder 4131 in its "down" position corresponding to being expanded and heavy weight. Since the shape memory springs 4113 are completely positioned outside of the container 4011, they can readily react to the change in temperature in its surrounding environment.

Figure 10:
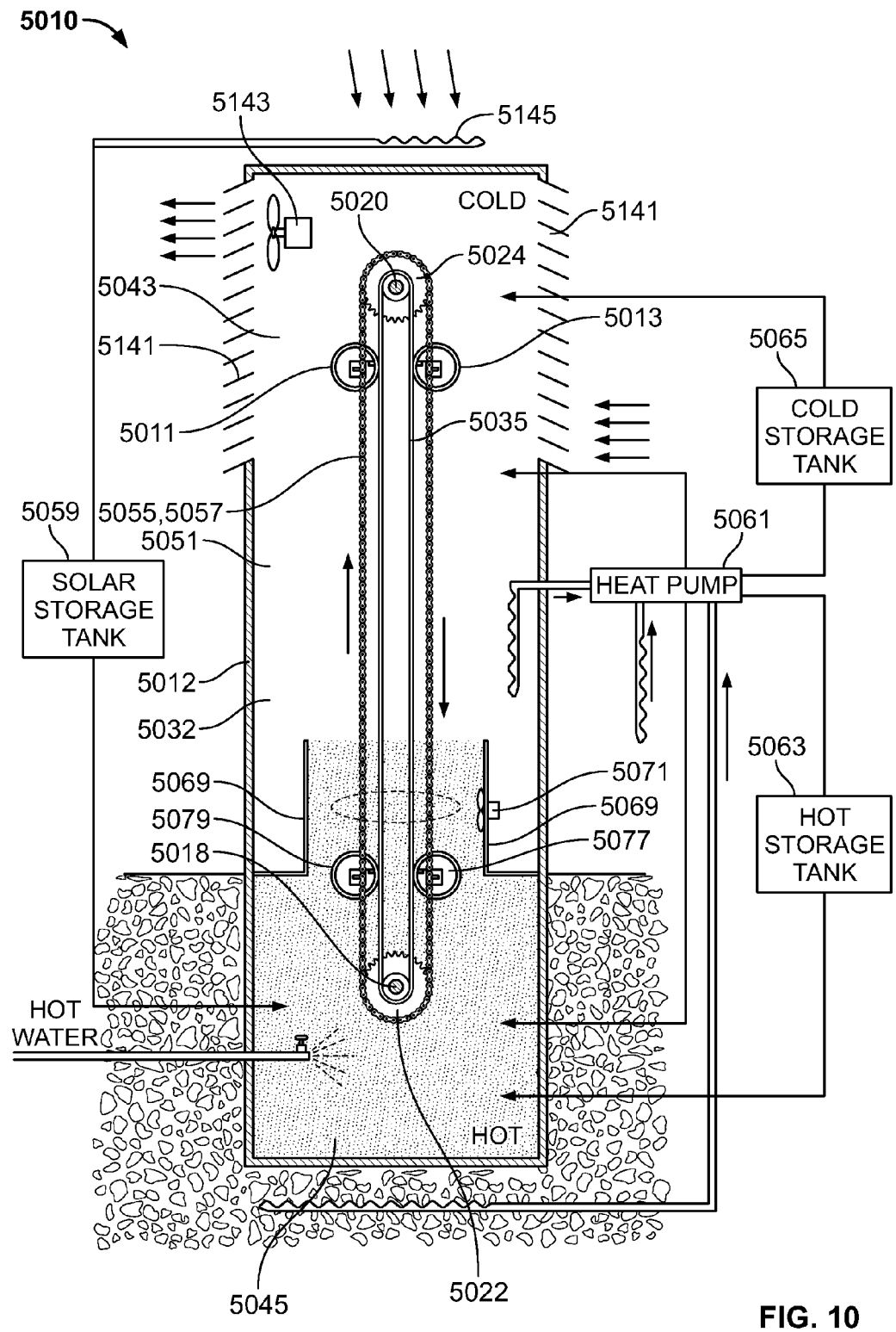
FIG. 10 is a cross-sectional schematic side view of an engine constructed in accordance with a sixth embodiment of the present invention.

Referring to FIG. 10, an engine 5010 constructed in accordance with a sixth exemplary embodiment of the invention is illustrated. The engine 5010 has a construction and operation that are basically identical to those of the embodiment shown in FIGS. 6-8B, unless otherwise indicated. The engine 5010 has containers 5011, 5013, 5077, 5079 coupled to a fluid hose 5035 and attached to chains 5055, 5057, which are adapted to engage sprockets 5020, 5022 mounted on shafts 5018, 5020.

The engine 5010 also has a housing 5012 containing a body of air 5032 with a top cool zone 5043, a middle zone 5051 and a bottom hot zone 5045. Grills 5141 or other suitable opening configurations are provided on upper sides of the housing 5012 to allow airflow therethrough. A fan 5143 is positioned within the housing 5012 near the grills 5141 to facilitate the movement of air through the top cool zone 5043.

Renewable energy sources are used to provide cold thermal energy to the top cool zone 5043 of the engine 5010. For instance, cool air from the external environment passes through the grills 5141 to maintain a low temperature condition in the top cool zone 5043. A solar panel 5145 is provided above the housing 5012 for absorbing solar energy which can be stored in a solar storage tank 5059 and/or be used to provide additional thermal energy to the bottom hot zone 5045 as needed. A heat pump 5061 is also provided to withdraw unneeded thermal energy from the middle zone 5051. The heat pump 5061 may also be configured to gather external thermal energy of any kind (e.g., solar, geothermal, ocean-thermal, etc.). Any excess hot or cold thermal energy drawn by the heat pump 5061 may be stored in hot and cold storage tanks 5063, 5065, respectively, and can be used to provide thermal energy to the bottom hot or top cool zones, 5045, 5043, respectively, as needed. L-shaped partitions 5069 are positioned between the middle zone 5051 and the bottom hot zone 5045 to partially block the intermixing of air. A curtain fan 5071 is also positioned on one of the L-shaped partitions 5069 to form an insulating air curtain between the middle zone 5051 and the bottom hot zone 5045.

The bottom hot zone 5045 is disposed underground to provide insulation and protection from the external environment. A hot thermal energy source provides hot thermal energy to the bottom hot zone 5045, said hot thermal energy source including geothermal energy, solar energy, hot fluid, or any other suitable renewable energy input. Due to the hot and cold thermal energy sources, a temperature gradient is formed in the housing 5012 where the bottom hot zone 5045 has a higher temperature than the top cool zone 5043.

The engine 5010 operates in a manner similar to that of the embodiment illustrated in FIGS. 6-8B, except that the locations of the hot zone 5045 and the cool zone 5043 are reversed. That is, unlike the hot and cool zones 3045, 3043 shown in FIG. 6, the hot and cold zones 5045, 5043 of FIG. 10 are located at a lower end and an upper end, respectively, of the housing 5012. Accordingly, shape memory springs used in the engine 5010 are adapted to contract in the bottom hot zone 5045 and expand in the top cool zone 5043. The engine 5010 may also operate with or without any valves controlling flow of working fluid to and from the containers 5011, 5013, 5077, 5079.

Figure 11:
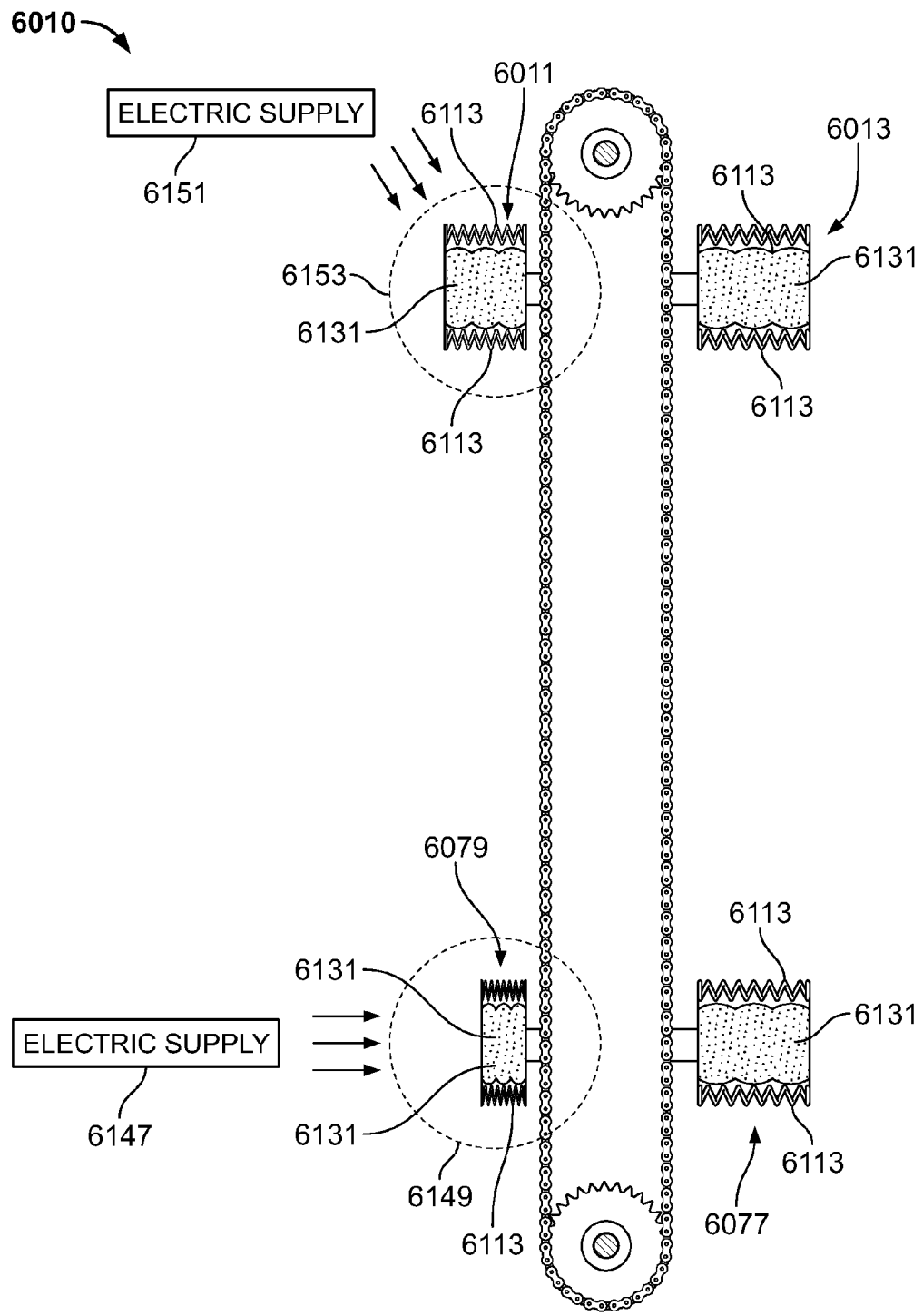
FIG. 11 is a cross-sectional schematic view of an engine constructed in accordance with a seventh embodiment of the present invention.

FIG. 11 schematically illustrates an engine 6010 constructed in accordance with a seventh exemplary embodiment of the present invention. The engine 6010 has a construction and operation that are basically identical to those of the embodiments shown in FIGS. 6-10, unless otherwise indicated below. The engine 6010 has a plurality of containers 6011, 6013, 6077, 6079, which are shown in their schematic side views in FIG. 11 for illustration purposes. Each of the containers 6011, 6013, 6077, 6079 has an expandable cylinder 6131 and a plurality of shape memory springs 6113 to actuate a corresponding one of the cylinders 6131. The engine 6010 utilizes magnetic force to actuate the shape memory springs 6113 and hence the cylinders 6131 and does not, therefore, require (but may include) hot and cold zones similar to those included in the embodiment of FIGS. 6-8A. More particularly, the engine 6010 includes a lower electric supply 6147 for creating a lower magnetic field 6149 adjacent a lower portion of the engine 6010 and an upper electric supply 6151 for creating an upper magnetic field 6153, which has a magnetic characteristic (e.g., a stronger or weaker magnetic field) different from that of the lower magnetic field 6149. The electric supplies 6147, 6151 can be any type of device that is capable of creating the magnetic fields 6149, 6153, including a wireless electric supply or similar devices known in the art. The magnetic field 6149 is adapted to cause the shape memory springs 6113 of a container passing therethrough to contract, while the magnetic field 6153 is adapted to cause such shape memory springs to expand. The magnetic fields 6149, 6153 can also actuate any valves utilized in the containers 6011, 6013, 6077, 6079 (similar to the valve 3091 shown in FIG. 8A) to allow a working fluid to flow in or out of same.

In one embodiment, the electric supply 6151 in the engine 6010 may be eliminated. In another embodiment, other mechanisms could be used to actuate the cylinders 6011, 6013, 6077, 6079 between their expanded and contracted states.

The present invention provides a number of benefits and advantages. For instance, the conversion of renewable thermal energy to kinetic energy is performed in an environmentally friendly and cost effective manner. The production of kinetic energy is provided in a mechanically simple manner (e.g., the force F produces motion in the chains 3055, 3057 or 5055, 5057 which impart rotational kinetic energy to the sprockets 3022, 3024 or 5022, 5024, respectively, and hence the shafts 3018, 3020 or 5018, 5020, respectively). In the event that solar, geothermal or electrical energy is not sufficient to operate the engine of the present invention, other thermal energy sources may be employed such as city waste heat, hot waste fluid, fuel cells, and any othsuitable thermal energy source known in the art.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

I claim:

1. An energy conversion apparatus comprising:
    a housing having an upper end, which is located at a first elevation, and a lower end, which is located at a second elevation lower than said first elevation, said housing having a first zone located adjacent said upper end and a second zone located adjacent said lower end;
    a movable loop extending between said lower and upper ends and passing through said first and second zones;
    a plurality of cylinders attached to said loop, each of said cylinders being movable through said first zone and said second zone conjointly with said loop, each of said cylinders being sized and shaped so as to receive a varying amount of working fluid and to assume expanded and contracted configurations when a corresponding one of said cylinders passes through said first zone and said second zones, respectively, each of said cylinders receiving said working fluid therein so as to have a first weight when it assumes its said expanded position and discharging said working fluid therefrom so as to have a second weight when it assumes its said contracted position, said first weight of each of said cylinders being greater than said second weight, said cylinders being arranged on said loop such that at least one of said cylinders is positioned on one side of said loop in its said expanded configuration after passing through said first zone and such that at least another one of said cylinders is positioned on an opposite side of said loop in its said contracted configuration after passing through said second zone, said at least one of said cylinders on said one side of said loop having a weight that is greater than the weight of said at least another one of said cylinders on said opposite side of said loop such that gravity causes said at least one of said cylinders to move downwardly toward said lower end of said housing and said at least another one of said cylinders to move upwardly toward said upper end of said housing so as to impart motion to said loop; and
    a hose connected to all of said cylinders such that said cylinders are in fluid communication with each other through said hose, said working fluid flowing from one of said cylinders to another of said cylinders as said cylinders move through said first and second zones,
    wherein said hose and said cylinders form a closed fluid system containing said working fluid, each of said cylinders receiving said working fluid from at least another of said cylinders through said hose when said each of said cylinders moves through said first zone, each of said cylinders discharging said working fluid through said hose to at least another of said cylinders when said each of said cylinders moves through said second zone,
    and wherein said hose includes a plurality of valves, each of said valves being connected to a corresponding one of said cylinders such that as said corresponding one of said cylinders enters said first zone, said each of said valves is opened to allow flow of said working fluid into said corresponding one of said cylinders, such that as said corresponding one of said cylinders leaves said first zone, said each of said valves is closed to inhibit discharging of said working fluid from said corresponding one of said cylinders, such that as said corresponding one of said cylinders enters said second zone, said each of said valves is opened to allow discharging of said working fluid from said corresponding one of said cylinders, and such that as said corresponding one of said cylinders leaves said second zone, said each of said valves is closed to inhibit flow of said working fluid into said corresponding one of said cylinders.

2. An energy conversion apparatus, comprising:
    a housing having an upper end, which is located at a first elevation, and an lower end, which is located at a second elevation lower than said first elevation, said housing having a first zone located adjacent said upper end and a second zone located adjacent said lower end;
    a movable loop extending between said lower and upper ends and passing through said first and second zones; and
    a plurality of cylinders attached to said loop, each of said cylinders being movable through said first zone and said second zone conjointly with said loop, each of said cylinders being sized and shaped so as to receive a varying amount of working fluid and to assume expanded and contracted configurations when a corresponding one of said cylinders passes through said first zone and said second zones, respectively, each of said cylinders receiving said working fluid therein so as to have a first weight when it assumes its said expanded position and discharging said working fluid therefrom so as to have a second weight when it assumes its said contracted position, said first weight of each of said cylinders being greater than said second weight, said cylinders being arranged on said loop such that at least one of said cylinders is positioned on one side of said loop in its said expanded configuration after passing through said first zone and such that at least another one of said cylinders is positioned on an opposite side of said loop in its said contracted configuration after passing through said second zone, said at least one of said cylinders on said one side of said loop having a weight that is greater than the weight of said at least another one of said cylinders on said opposite side of said loop such that gravity causes said at least one of said cylinders to move downwardly toward said lower end of said housing and said at least another one of said cylinders to move upwardly toward said upper end of said housing so as to impart motion to said loop, wherein each of said cylinders includes an actuating member attached thereto for causing a corresponding one of said cylinders to assume said expanded configuration when said corresponding one of said cylinders passes through said first zone and to assume said contracted configuration when said corresponding one of said cylinders passes through said second zone, and wherein said actuating member of each of said cylinders includes a shape memory spring coupled to a corresponding one of said cylinders, said shape memory spring of each of said cylinders being configured to assume a contracted shape when a corresponding one of said cylinders passes through one of said first and second zones and an expanded shape when a corresponding one of said cylinders passes through the other of said first and second zones.

3. The apparatus of claim 2, wherein said working fluid includes liquid.

4. The apparatus of claim 3, wherein said liquid includes an anti-freeze material to inhibit said liquid from freezing.

5. The apparatus of claim 2, wherein said shape memory spring of each of said cylinders is configured to assume its said contracted shape when a corresponding one of said cylinders passes through said first zone and to assume its said expanded shape when a corresponding one of said cylinders passes through said second zone.

6. The apparatus of claim 5, wherein said shape memory spring of each of said cylinders assumes its said contracted shape so as to create a suction force in a corresponding one of said cylinders for drawing said working fluid thereinto and assumes its said expanded shape so as to permit discharge of said working fluid from a corresponding one of said cylinders.

7. The apparatus of claim 2, wherein said shape memory spring of each of said cylinders is configured to assume its said expanded shape when a corresponding one of said cylinders passes through said first zone and to assume its said contracted shape when a corresponding one of said cylinders passes through said second zone.

8. The apparatus of claim 7, wherein said shape memory spring of each of said cylinders assumes its said contracted shape so as to discharge said working fluid therefrom and assumes its said expanded shape so as to permit flow of said working fluid thereinto.

9. The apparatus of claim 2, wherein each of said cylinders includes a piston movable between an extended position, in which it is extended from a corresponding one of said cylinders, and a second position, in which it is retracted into a corresponding one of said cylinders, each of said cylinders assuming its said expanded configuration when said piston is in said extended position and assuming its said contracted configuration when said piston is in said retracted position, said shape memory spring of each of said cylinders being coupled to said piston of a corresponding one of said cylinders so as to move said piston between said extended and retracted positions.

10. The apparatus of claim 2, wherein each of said cylinders includes a bellow-type container, a movable bracket, which is connected to one end of said bellow-type container, and a plate, which is connected to an opposite end of said bellow-type container, said shape memory spring being attached to said movable bracket and said plate for causing a corresponding one of said cylinders to assume one of said expanded and contracted configurations.

11. The apparatus of claim 2, further comprising a heat pump connected to said housing for storing excess thermal energy in at least one storage tank.

12. The apparatus of claim 11, wherein said at least one storage tank includes a first tank for storing high thermal energy and a second tank for storing low thermal energy, said high thermal energy stored in said fist tank and said low thermal energy stored in said second storage being selectively supplied to said first and second zones, respectively.

13. The apparatus of claim 2, wherein said loop includes first and second movable loops, each of said cylinders being affixed to said first loop at one end thereof and to said second loop at an opposite end thereof.

14. The apparatus of claim 13, further comprising a pair of upper sprockets, one of which is coupled to said first loop and the other of which is coupled to said second loop; and a pair of lower sprockets, one of which is coupled to said first loop and the other of which is coupled to said second loop, said pair of upper sprockets and said pair of lower sprockets permitting rotational movement of said first and second loops.

15. The apparatus of claim 2, wherein said lower end of said housing is positioned underground to provide insulation to said lower end.

16. The apparatus of claim 2, wherein each of said cylinders is caused to assume said expanded and contracted orientations by magnetic fields applied to said first and second zones, respectively.

17. An energy conversion apparatus, comprising:
a housing having an upper end, which is located at a first elevation, and an lower end, which is located at a second elevation lower than said first elevation, said housing having a first zone located adjacent said upper end and a second zone located adjacent said lower end;
a movable loop extending between said lower and upper ends and passing through said first and second zones; and
a plurality of cylinders attached to said loop, each of said cylinders being movable through said first zone and said second zone conjointly with said loop, each of said cylinders being sized and shaped so as to receive a varying amount of working fluid and to assume expanded and contracted configurations when a corresponding one of said cylinders passes through said first zone and said second zones, respectively, each of said cylinders receiving said working fluid therein so as to have a first weight when it assumes its said expanded position and discharging said working fluid therefrom so as to have a second weight when it assumes its said contracted position, said first weight of each of said cylinders being greater than said second weight, said cylinders being arranged on said loop such that at least one of said cylinders is positioned on one side of said loop in its said expanded configuration after passing through said first zone and such that at least another one of said cylinders is positioned on an opposite side of said loop in its said contracted configuration after passing through said second zone, said at least one of said cylinders on said one side of said loop having a weight that is greater than the weight of said at least another one of said cylinders on said opposite side of said loop such that gravity causes said at least one of said cylinders to move downwardly toward said lower end of said housing and said at least another one of said cylinders to move upwardly toward said upper end of said housing so as to impart motion to said loop, wherein said housing includes a body of air defining said first and second zones, said air in said first zone having a first temperature and said air in said second zone having a second temperature different from said first temperature so as to cause each of said cylinders to assume one of its expanded and contracted configurations as said each of said cylinders passes through said first and second zones, respectively, wherein said first temperature of said first zone is greater than said second temperature of said second zone due, at least in part, to convection of said air inside said housing, wherein said upper end of said housing is constructed such that said air in said first zone is heated by solar energy so as to provide thermal energy to said first zone, wherein said housing includes at least one partition located between said first and second zones so as to inhibit mixing of said air in said first zone with said air in said second zone, and wherein said housing includes an air curtain located between said first and second zones so as to cooperate with said at least one partition for inhibiting mixing of said air in said first zone with said air in said second zone.

18. The apparatus of claim 17, wherein said upper end of said housing includes a glass panel so as to transmit solar energy to said first zone and to provide thermal insulation to said air in said first zone.

19. The apparatus of claim 18, further comprising a cold thermal energy source connected to said housing adjacent said second zone for keeping a low temperature condition in said second zone.

20. The apparatus of claim 19, wherein said cold thermal source includes one of a cold water input and a geothermal energy input.

* * * * *